Jan. 27, 1931.  L. A. WINNE  1,790,128
DEVICE FOR TESTING SPEEDOMETERS
Filed April 5, 1928  2 Sheets-Sheet 1

Inventor
Louis A. Winne

By Mason Fenwick & Lawrence
Attorneys

Jan. 27, 1931.   L. A. WINNE   1,790,128
DEVICE FOR TESTING SPEEDOMETERS
Filed April 5, 1928   2 Sheets-Sheet 2

Inventor
Louis A. Winne
By Mason Fenwick Lawrence
Attorneys

Patented Jan. 27, 1931

1,790,128

UNITED STATES PATENT OFFICE

LOUIS A. WINNE, OF WILMINGTON, DELAWARE

DEVICE FOR TESTING SPEEDOMETERS

Application filed April 5, 1928. Serial No. 267,648.

This invention relates to improvements in machines and methods for testing speedometers without removing them from the automobile or other vehicle to which they may be attached.

An object of this invention is to provide an apparatus for testing speedometers without detaching them from the vehicle and at the same time function to test the accuracy of the entire speedometer equipment, thus determining whether the speedometer head is properly adjusted and whether the speedometer driving gears of the vehicle are of the proper ratio to be used with the tire size and the rear axle ratio of the vehicle.

Other objects of this invention will appear from the following detailed description of the device, as disclosed in the two sheets of drawings which are herewith made a part of this application.

In the drawings—

Figure 2:
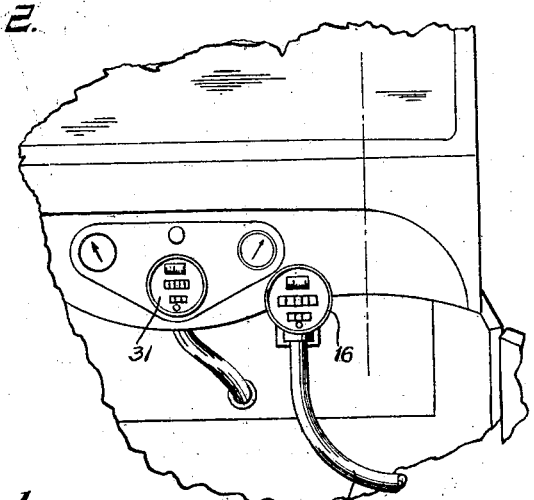
Fig. 2 represents a portion of the instrument board, disclosing the ordinary location of the speedometer of the vehicle, and the master speedometer together with connections leading therefrom.

In the device for testing speedometers, according to this invention, numeral 1 designates a roller having a suitably formed crown and rigidly attached to the shaft member 2, bearing members 3 and 4, held in operative relationship by means of frame members 5 and 6, which are connected together in spaced relationship by means of a web member 7, frame elements 5 and 6 being so placed that the roller 1 may revolve freely therebetween.

A spiral drive gear 8 is securely fastened to the end of the shaft member 2, and is adapted to mesh with a spiral driven gear 9, rigidly mounted on a spindle or shaft member 10, which is held in rotatable position by means of a sleeve portion 11 properly threaded and adapted to be tapped into a portion 12, extending from the frame member 6. The inner end of the shaft member 10 is rotatably mounted in an aperture 13 of the extension 12, the aperture thereby functioning to provide a suitable bearing in which the shaft 10 and the gear 9 may revolve.

Figure 1:
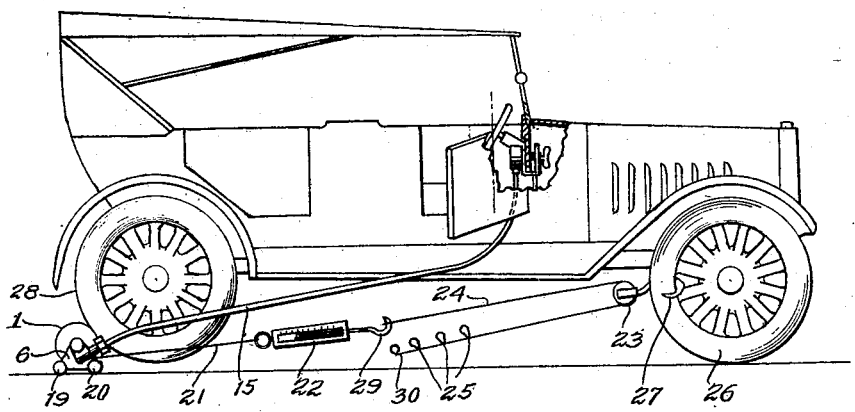
Fig. 1 illustrates a side elevational view of an automobile showing the speedometer testing apparatus in assembled relationship thereto.
Figure 3:
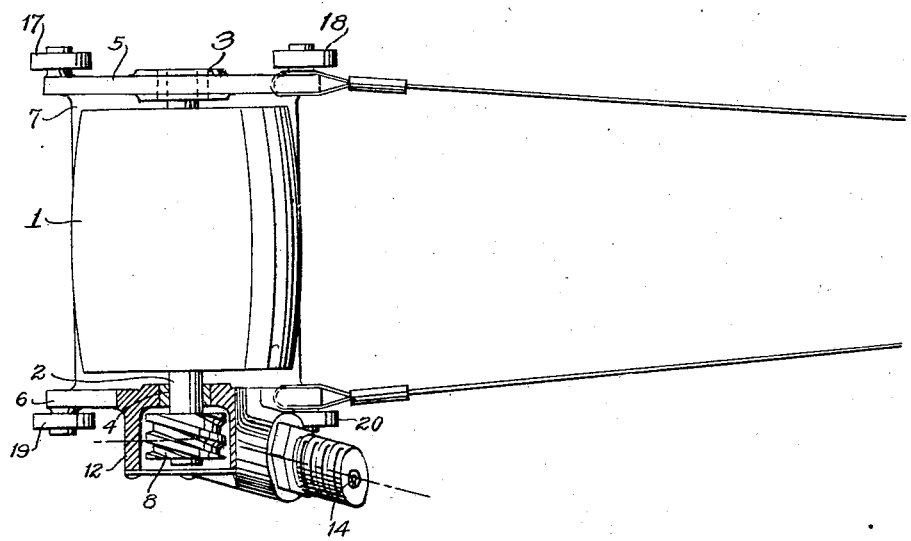
Fig. 3 illustrates a plan view of the testing device, disclosing the relationship between the roller and the reduction gear.
Figure 4:
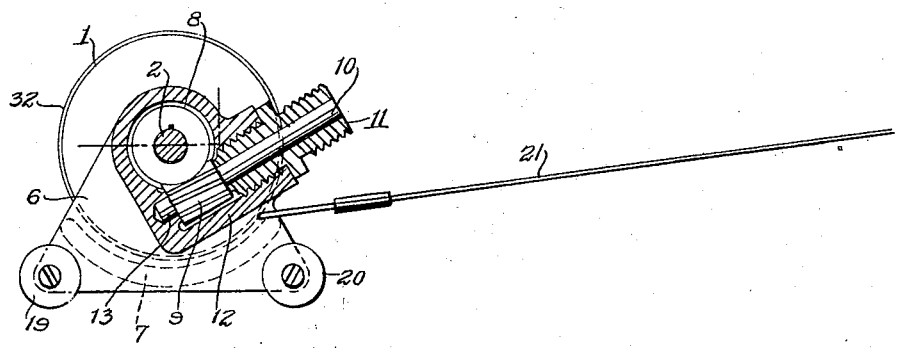
Fig. 4 represents an end elevational view of Figure 3.

The sleeve member 11 is properly threaded and the shaft 10 apertured, as at 14, for receiving the end of a flexible shaft 15, of standard make, attached at the other end to a speedometer 16 of the ordinary type used in connection with automobiles, as clearly disclosed in Figures 1 and 2.

The frame members 5 and 6 are mounted upon wheel elements 17, 18, 19, and 20. A cable member 21 is attached to suitable portions 22 of the frame members 5 and 6, and the rear end of a spring balance 22 is attached to the cable 21 and brought into operating relationship with a pulley 23, by means of a cable portion 24, extending thereover and having a number of loop portions 25, formed in the free end thereon. The pulley 23 is adapted to be held in suitable relationship to a wheel 26 of the vehicle by means of a hook 27, or any other adaptable device, as clearly disclosed in Figure 1.

The lower end of the flexible shaft 15 is connected with the sleeve 11 and the shaft 10, as clearly disclosed in the drawings and described above, while the master speedometer 16 is connected to the upper end of the flexible shaft 15, as clearly shown in Figure 2.

In operation, one of the rear wheels 28 of a vehicle is jacked up, while the opposite rear wheel may be blocked or otherwise to prevent a forward or backward motion. The roller 1 is moved up in contact with the rear wheel 28, while the hook 27 is adjusted around the front wheel rim 26, front wheel spindle, or at any convenient point.

The free end 30 of the cable is then pulled until the spring scale 22 is stretched to a pre-determined tension, but not to the limits of its scale. One of the loops 25 in the cable 24 is placed over the hook 29 of the spring scale draw bar to maintain the proper tension.

The brakes of the vehicle are then released, the motor thereof is started, and the transmission gears of the automobile or otherwise are thrown into mesh in the usual manner, and as the jacked up rear wheel 28 revolves, it will function to drive the master speedometer 16 by means of roller 1, gears 8 and 9, and the flexible shaft 15.

A comparison of readings of the master speedometer 16 and the readings of the speedometer 31 of the vehicle may be made at all speeds. If the roller 1 is of proper diameter and the gears 8 and 9 are of suitable corresponding ratio, then the reading of the master speedometer 16 will be correct irrespective of the diameter of the tire, since the motion is taken off at the circumference thereof.

Since the roller 1 is crowned, as clearly disclosed at 32, it will ride along one line approximately in the center of the tire, even though the center line of the test machine and the center line of the vehicle be only approximately parallel. Owing to the resiliency of the spring of the balance 22 and the freedom of rotation of wheel members 17, 18, 19, and 20, the roller 1 will remain constantly in contact with the tire irrespective of the eccentricities or irregularities in circumference of the tire.

The device may be so constructed to fit the widest tire commonly used, while the cable 24 may be provided with sufficient number of loops 25, suitably spaced, to accommodate the test machine to vehicles of various wheel bases and provide for various points of attachment for the hook 27.

It is understood that substitutions and alterations may be made in the above disclosure both in the specification and drawings within the scope of the appended claims, without affecting the merits of this invention.

What I claim is:

1. In a speedometer tester for use in connection with power driven vehicles, a master speedometer, a device for registering the master speedometer, comprising a plurality of members actuated by contact with a moving portion of the vehicle, means connecting said contact members with the vehicle including a spring adjustably connected to a portion of the vehicle for bringing tension to bear between the vehicle and the plurality of members.

2. In a speedometer tester for use in connection with power driven vehicles, a master speedometer, a device for registering the master speedometer, comprising a plurality of members actuated by contact with a moving portion of the vehicle, means for bringing tension to bear between the vehicle and the plurality of members, the plurality of members comprising a roller element having a crown thereon and shaft for rotatably supporting the roller.

3. In a speedometer tester for use in connection with power driven vehicles, a master speedometer, a device for registering the master speedometer, comprising a plurality of members actuated by contact with a moving portion of the vehicle, a spring adjustably connected to a portion of the vehicle and to the contact members for bringing tension to bear between the vehicle and the plurality of members, the plurality of members comprising a roller element having a crown thereon and shaft for rotatably supporting the roller, a movable frame for supporting the shaft.

4. In a speedometer tester for use in connection with power driven vehicles, a master speedometer, a device for registering the master speedometer, comprising a plurality of members actuated by contact with a moving portion of the vehicle, a spring adjustably connected to a portion of the vehicle and to the contact members for bringing tension to bear between the vehicle and the plurality of members, the plurality of members comprising a roller element having a crown thereon and shaft for rotatably supporting the roller, a movable frame for supporting the shaft, a sleeve portion extending from the frame, gearing mounted upon the shafts and in the sleeve portion.

5. In a speedometer tester for use in connection with power driven vehicles, a master speedometer, a device for registering the master speedometer, comprising a plurality of members actuated by contact with a moving portion of the vehicle, a spring adjustably connected to a portion of the vehicle and to the contact members for bringing tension to bear between the vehicle and the plurality of members, the plurality of members comprising a roller element having a crown thereon and shaft for rotatably supporting the roller, a movable frame for supporting the shaft, a sleeve portion extending from the frame, gearing mounted upon the shafts and in the sleeve portion, and connecting means from the gearing to the master speedometer.

In testimony whereof I affix my signature.

LOUIS A. WINNE.